US007668096B2

(12) United States Patent
Ignatowski et al.

(10) Patent No.: US 7,668,096 B2
(45) Date of Patent: *Feb. 23, 2010

(54) APPARATUS FOR MODELING QUEUEING SYSTEMS WITH HIGHLY VARIABLE TRAFFIC ARRIVAL RATES

(75) Inventors: Michael Ignatowski, Red Hook, NY (US); Noshir C. Wadia, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 161 days.

This patent is subject to a terminal disclaimer.

(21) Appl. No.: 12/036,043

(22) Filed: Feb. 22, 2008

(65) Prior Publication Data

US 2008/0151923 A1 Jun. 26, 2008

Related U.S. Application Data

(63) Continuation of application No. 10/731,862, filed on Dec. 9, 2003, now Pat. No. 7,376,083.

(51) Int. Cl.
*H04L 12/56* (2006.01)
(52) U.S. Cl. .................. 370/232; 370/235; 370/252; 370/412
(58) Field of Classification Search ............... 370/232, 370/235, 252, 349, 412, 474; 379/84; 455/452
See application file for complete search history.

(56) References Cited

U.S. PATENT DOCUMENTS

| 4,788,715 A | 11/1988 | Lee | 379/84 |
|---|---|---|---|
| 5,193,151 A | 3/1993 | Jain | 395/200 |
| 5,231,649 A | 7/1993 | Duncanson | 375/38 |
| 5,343,465 A | 8/1994 | Khalil | 370/17 |
| 5,477,531 A | 12/1995 | Mckee et al. | 370/249 |
| 5,706,405 A | 1/1998 | Short et al. | 706/45 |

(Continued)

FOREIGN PATENT DOCUMENTS

WO WO9830059 7/1998

(Continued)

OTHER PUBLICATIONS

"SQL Server Configuration Performance Checklist" Excerpt from; http://www.sql-server-performance.com/sql_server_performance_audits5.asp.

(Continued)

*Primary Examiner*—William Trost, IV
*Assistant Examiner*—Emmanuel Maglo
(74) *Attorney, Agent, or Firm*—Kunzler & McKenzie (57) ABSTRACT

An apparatus is provided for modeling queuing systems with highly variable traffic arrival rates. The apparatus includes means to associate a value with a pattern of highly variable arrival rates that is simple and intuitive, and a means to accurately model queuing delays in systems that are characterized by bursts of arrival activity. The queuing delay is determined by a sum of queuing delays after first applying a weighting factor to the queuing delay based upon a random arrival rate, and a different weighting factor to the queuing delay based upon a bursty variable arrival rate. The weighting factors are variants of the server utilization. The model facilitates specification of server characteristics and configurations to meet response time metrics.

18 Claims, 6 Drawing Sheets

U.S. PATENT DOCUMENTS

| | | | |
|---|---|---|---|
| 5,724,262 A | 3/1998 | Ghahramani | 364/551.01 |
| 5,796,633 A | 8/1998 | Burgess et al. | 709/224 |
| 5,805,681 A | 9/1998 | Srikant et al. | 379/133 |
| 5,812,529 A | 9/1998 | Czarnik et al. | 709/203 |
| 5,819,030 A | 10/1998 | Chen et al. | 395/200.5 |
| 5,893,905 A | 4/1999 | Main et al. | 705/11 |
| 5,913,041 A | 6/1999 | Ramanathan et al. | 395/200.63 |
| 5,936,940 A | 8/1999 | Marin et al. | 370/232 |
| 5,951,644 A | 9/1999 | Creemer | 709/229 |
| 6,006,260 A | 12/1999 | Barrick et al. | 709/224 |
| 6,014,669 A | 1/2000 | Slaughter et al. | 707/10 |
| 6,023,681 A | 2/2000 | Whitt | 705/8 |
| 6,046,981 A | 4/2000 | Ramamurthy et al. | 370/232 |
| 6,084,864 A | 7/2000 | Liron | 370/316 |
| 6,119,097 A | 9/2000 | Ibarra | 705/11 |
| 6,122,254 A | 9/2000 | Aydemir et al. | 370/235 |
| 6,125,408 A | 9/2000 | McGee et al. | 710/8 |
| 6,182,206 B1 | 1/2001 | Baxter | 712/43 |
| 6,202,190 B1 | 3/2001 | Rogier | 714/815 |
| 6,226,266 B1 | 5/2001 | Galand et al. | 370/235 |
| 6,304,913 B1 | 10/2001 | Rune | 709/241 |
| 6,311,175 B1 | 10/2001 | Adriaans et al. | 706/25 |
| 6,317,416 B1 | 11/2001 | Giroux et al. | 370/232 |
| 6,321,264 B1 | 11/2001 | Fletcher et al. | 709/224 |
| 6,430,160 B1 | 8/2002 | Smith et al. | 370/252 |
| 6,453,426 B1 | 9/2002 | Gamache et al. | 714/4 |
| 6,556,974 B1 | 4/2003 | D'Alessandro | 705/10 |
| 6,564,174 B1 | 5/2003 | Ding et al. | 709/224 |
| 6,684,252 B1 | 1/2004 | Chow | 709/224 |
| 6,789,050 B1 | 9/2004 | Reeser et al. | 709/224 |
| 6,799,154 B1 | 9/2004 | Aragones et al. | 703/13 |
| 6,973,622 B1 | 12/2005 | Rappaport et al. | 709/221 |
| 2001/0051861 A1 | 12/2001 | Tamura et al. | 703/13 |
| 2002/0010852 A1 | 1/2002 | Arnold et al. | 713/1 |
| 2002/0049687 A1 | 4/2002 | Helsper et al. | 706/7 |
| 2002/0056007 A1 | 5/2002 | Gersht et al. | 709/235 |
| 2002/0072956 A1 | 6/2002 | Willems et al. | 705/10 |
| 2002/0080726 A1 | 6/2002 | Klassen et al. | 370/252 |
| 2002/0107723 A1 | 8/2002 | Benjamin et al. | 705/11 |
| 2002/0107954 A1 | 8/2002 | Ferguson et al. | 709/224 |
| 2002/0107977 A1 | 8/2002 | Dunshea et al. | 709/238 |
| 2002/0112038 A1 | 8/2002 | Hessmer et al. | 709/220 |
| 2002/0126701 A1 | 9/2002 | Requena | 370/469 |
| 2002/0138443 A1 | 9/2002 | Schran et al. | 705/64 |
| 2002/0173997 A1 | 11/2002 | Menard et al. | 705/7 |
| 2002/0174217 A1 | 11/2002 | Anderson | 709/224 |
| 2002/0184065 A1 | 12/2002 | Menard et al. | 705/7 |
| 2003/0018778 A1 | 1/2003 | Martin et al. | 709/224 |
| 2003/0050814 A1 | 3/2003 | Stoneking et al. | 705/7 |
| 2003/0148768 A1 | 8/2003 | Kakani et al. | 455/452 |
| 2003/0149614 A1 | 8/2003 | Andrus et al. | 705/11 |
| 2003/0177160 A1 | 9/2003 | Chie et al. | 709/100 |
| 2003/0200059 A1 | 10/2003 | Ignatowski et al. | 702/186 |
| 2005/0086331 A1 | 4/2005 | Wadia et al. | 709/221 |

FOREIGN PATENT DOCUMENTS

| | | |
|---|---|---|
| WO | WO0007129 | 7/1999 |
| WO | WO9957661 | 11/1999 |

OTHER PUBLICATIONS

Aversa, R.; Mazzocca, N.; Villano, U.; "Design of a Simulator of Heterogeneous Computing Environments", Simulation Practice and Theory, vol. 4, Issues 2-3, May 15, 1996, pp. 97-117.

Campbell, B.; "Systems Dynamics in Information Systems Analysis: An Evaluation Case Study" Proceedings of Systems Modeling for Business Process Improvement Workshop, Coleraine, Ireland, Mar. 29-31, 1999, Chapter 3, pp. 33-46.

Presley, A.R.; "A Multi-View Enterprise Modeling Scheme", Proceedings of the $6^{th}$ Industrial Engineering Research Conference, Miami, Florida, May 1997, 6 pages.

Yazdani, B.; "Models of Concurrent Product Design and Development in the Automotive Industry", ICE '97, International Conference on Concurrent Enterprising for Competitiveness, $4^{th}$, Nottingham, Oct. 8-10, 1997, pp. 99-107.

Song, J., et al.; "Design Alternatives for Scalable Web Server Accelerators", IBM T.J. Watson Research Center, IEEE 200, pp. 184-192.

Iyengar, A. et al.,; "A General Methodology for Characterizing Access Patterns and Analyzing Web Server Performance", Proceedings of the Sixth International Symposium on Modeling, Analysis and Simulation of Computer and Telecommunication Systems, Montreal, Canada, Jul. 1998, pp. 167-174.

Challenger, J. et al.; "Engineering Highly Accessed Web Sites for Performance", IBM Research, T.J. Watson Research Center, Yorktown Heights, NY 10598, 19 pages.

Iyengar, A. et al.; "High-Performance Web Site Design Techniques", Excerpts from IEEE Internet Computing, Mar.-Apr. 2000, pp. 17-26 http://computer.org/internet/.

Iyengar, A. et al.; "An Analysis of Web Server Performance", IBM Research Division, T.J. Watson Research Center, Yorktown Heights, NY 10598, 5 pages.

Iyengarm A. et al.; "Analysis and Characterization of Large-Scale Web Server Access Patterns and Performance", IBM Research Division, IBM T.J. Watson Research Center, Yorktown Heights, NY 10598, 30 pages.

H. P. Schwefel et al. "Impact of Aggregated Self-Similar ON/OFF Traffic on Delay in Stationary Queuing Models" Performance Evaluation Conference, vol. 43 No. 4., p. 203-21, Mar. 2001.

"Performance of Information and Communication Systems. IFIP TC6/WG6/3 Seventh International Conference on Performance of Information and Communication Systems" May 1998, Lund, Sweden.

"Proceedings of Australian Telecommunication Networks and applications Conference 1994". ATNAC '94. Melbourne, Vic., Australia, Dec. 5-7, 1994 "Real- Time Communications in Broadband Integrated Networks", Mehrpour, H.

Victor Solo, "On Queuing Theory for Broadband Communication Network Traffic with Long Range Correlation" Proceedings of the $34^{th}$ IEEE Conference on Decision and Control, vol. 1, p. 853-88, Dec. 1995.

Jensen, "Extension of Hayward's Approximation", Twelfth Nordic Tele-traffic Seminar NTS12, p. 345-55, Aug. 1995.

Tom Slater, "M/M/1 Queues", Jun. 2000 pp. 1-3, http://www.dcs.ed.ac.uk/home/jeh/Simjava/queueing/mm1_q/mm1_q.html.

Griffiths, "The Coefficient of Variation of Queue Size for Heavy Traffic", University of Wales, Cardiff Journal of the Operational Research Society (1996) 47, 1071-1076.

Hadidi, A Queuing Model With Variable Arrival Rates, (received Dec. 15, 1972) Department of Mathematics and Statistics, College of Arts and Sciences, Pahlavi Univeristy, Shiraz Iran.

APPARATUS FOR MODELING QUEUEING SYSTEMS WITH HIGHLY VARIABLE TRAFFIC ARRIVAL RATES

RELATED APPLICATIONS

This application is a continuation of U.S. patent application Ser. No. 10/731,862 filed on Dec. 9, 2003, entitled METHOD FOR MODELING QUEUEING SYSTEMS WITH HIGHLY VARIABLE TRAFFIC ARRIVAL RATES, and claims all rights of priority and incorporation available due to this continuation relationship.

BACKGROUND OF THE INVENTION

1. Field of the Invention

The invention relates to modeling system performance. Specifically, the invention relates to an apparatus for modeling traffic server system performance under conditions characterized by highly variable traffic arrival rates.

2. Description of the Related Art

A dilemma faced by most high volume eBusiness websites, including web servers, application servers, and database servers, is that it's always difficult, though highly desirable, to find a cost-efficient way to meet some key performance metrics or services levels (especially those relating to availability) under unanticipated highly variable workloads without investing heavily in additional hardware resources that is idling most of the time.

The task of planning an optimum configuration for large Web servers has become ever challenging. This is because the hardware and software structure of large Web sites grows increasingly complex, and the characteristics of the associated traffic arrival patterns and associated workloads are at best poorly understood, or at worst, essentially unknown because the system has yet to be implemented.

Even with this growing complexity, typical IT infrastructures can be analyzed and related models (i.e. simulators) can be developed to assist in predicting and planning how to meet future requirements. Network loads can be characterized by identifying key traffic parameters that affect network sizing and performance, such as packet size distribution, packet throughput, and packet interarrival time distribution. However, the results are often not satisfactory. The predictions can become complex when, as is often the case, there are many different hardware and software configurations that must be tested, and there are numerous performance criteria that must all be simultaneously met, while at the same time maximizing system throughput for the number of concurrent users supported by the system.

Capacity planning and performance modeling of complex computer systems generally require detailed information about the traffic arrival patterns and workload assumed to be running on those systems. Studies have shown that network traffic tends to be "bursty", rather than evenly distributed over time. Traffic burstiness may be defined as the tendency of data packets to arrive in bursts, with the inter-packet arrival time within a burst being much smaller than the average inter-packet arrival time outside of the burst.

Bursty traffic can have a significant effect on the queuing delays and response times of a network, since it can cause unpredicted capacity overloads from which the network must recover. Extended overloads contribute to network congestion and increase the probability of buffer overruns and dropped packets. Dropping packets to prevent extended overloads affects the quality of service and usually results in degraded performance.

The introduction of high speed networking technologies and high performance personal computers and workstations, which are capable of transmitting packets at a very high rate, has increased the potential variability of network traffic dramatically. In addition to the variability in network load and packet arrival rates, packets transmitted by these systems are generally closely related. The packets associated with the same application tend to arrive at the same destination over a short time period. This correlation is evident, for example, when a large file is transmitted from a file server to a diskless workstation.

Detailed performance studies of a complex server system typically involves queuing theory, a specialized branch of mathematics that studies the servicing of a succession of requests on a resource. For example, queuing theory has been widely applied in the study of highway traffic patterns, network servers, and even patrons of a bank. The basis for many of these performance studies is the analysis of (1) the arrival of requests and (2) the time to service the requests. If the average time to service a request is greater than the average arrival time, a large queue will form.

Service providers typically are interested in achieving metrics associated with a maximum time that a request waits for service (queuing delay), and a maximum total time until the request is satisfied (total delay). The total delay is typically the sum of the queuing delay and the service delay. It is desirable in system modeling to provide a system configuration that provides a minimum total delay in almost all cases.

Simple capacity planning can be done by calculating the number of users per second that can be processed without exceeding the maximum utilization requirements of any of the system resources (i.e. processors, disks, network). More detailed estimates that also project the overall response time per user (factoring in queuing effects on various resources) can also be made. Modeling queuing delay performance often requires a projection of an average arrival rate and an assumption of an arrival distribution pattern.

Models employing queuing theory generally predict the behavior of systems that service randomly arising demands. A Poisson pattern is usually assumed wherein the probability of an arrival is proportional to the length of a time interval. It follows that the inter-arrival times of a Poisson pattern are a sequence of independent and identically distributed random variables with an exponential density function.

However, web site traffic can be highly variable under certain conditions such as "Stock Market Storms," "Holiday sales," "breaking news stories", and other unanticipated events. Under these conditions, inter-arrival times between web user visits often include periods of high activity followed by periods of low activity, resulting in an arrival distribution that deviates substantially from an exponential distribution. This highly variable inter-arrival pattern results in an average response time that can be much longer than the prediction a typical Poisson model would predict.

A metric known as a "coefficient of variation", a measurement of the inter-arrival time standard deviation divided by the inter-arrival time mean, can be applied to systems as a measurement of variability. In some systems, the distribution of inter-arrival times cluster tightly about the mean, producing a relatively small standard deviation and hence a coefficient of variation much less than unity. For example, in deterministic arrival processes the inter-arrival times are synchronous. Thus, the coefficient of variation is zero. The tick of a clock illustrates a deterministic inter-arrival time distribution. In a deterministic inter-arrival time distribution, there is no variation.

An exponential inter-arrival time distribution produces a coefficient of variation with a value of one. An exponential arrival process assumes a random arrival pattern. Historically, queuing models have assumed a random arrival pattern and used the exponential inter-arrival time distribution. However, studies of many "real world" traffic arrival rate patterns, such as web site traffic, show highly variable, bursty arrival patterns with coefficient of variation values significantly greater than one. Similarly, studies of highway traffic patterns reveal the same type of bursty arrival patterns with clusters correlating to physical locations and times of the day. Consequently, modeling such systems assuming an exponential arrival time distribution predicts shorter response times than are experienced in real life, and can lead the service provider to underestimate the server capability required to meet response time metrics.

There exists an accepted basis in queuing theory to solve for cases wherein the coefficient of variability is greater than one. Unfortunately, the queuing theory equations are complex and often require inputs that are not readily available. For example, significant historical arrival rate information may be required. To be statistically valid, the historical arrival rate information may be required to span periods that encompass traffic patterns demonstrating low and high arrival rates. Furthermore, the historical data may be required to be representative of the future arrival patterns. Companies with dynamic growth rates and changing business patterns may have great difficulty obtaining historical data that truly represents their future traffic arrival patterns. In addition, the established queuing theory equations applicable to high values for inter-arrival coefficient of variation are not acceptably accurate for low levels of server utilization.

Accordingly, a need exists for an apparatus for simply and accurately modeling highly variable queue arrival rates. In particular, the apparatus should generate model results that facilitate high quality predictions for resources required to satisfy the highly variable queue arrival rates within pre-defined quality of service parameters. In addition, the apparatus should generate model results that substantially correspond to real world experience for comparable queuing systems and should accurately portray the effect of different levels of resource utilization.

SUMMARY OF THE INVENTION

The present invention has been developed in response to the present state of the art, and in particular, in response to the problems and needs in the art that have not yet been met for modeling queuing systems with highly variable arrival rates. Accordingly, the present invention has been developed to provide an apparatus for modeling systems with highly variable arrival rates that overcome many or all of the above-discussed shortcomings in the art.

The apparatus according to the present invention includes an input module, an arrival module, a coefficient of variation (COV) module, an exponential (EXP) module, and a weighting module. In one embodiment, the input module receives parameters characterizing service attributes and traffic arrival patterns including an index of burstiness, the index of burstiness being an estimate of the variation between a normal period and a bursty period.

The arrival module determines an inter-arrival COV using the index of burstiness. The COV module determines a COV queue delay derived from the inter-arrival COV and parameters characterizing the server. The EXP module determines an EXP queue delay using queuing algorithms based upon an exponentially distributed inter-arrival time pattern. The weighting module determines a queue delay using a weighted combination of the COV queue delay and the EXP queue delay. In certain embodiments the weighting module uses a server utilization ratio as a weighting factor, emphasizing the COV queue delay at high utilization and the EXP queue delay at low utilization.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus of the present invention, as represented in FIGS. 1 through 8, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
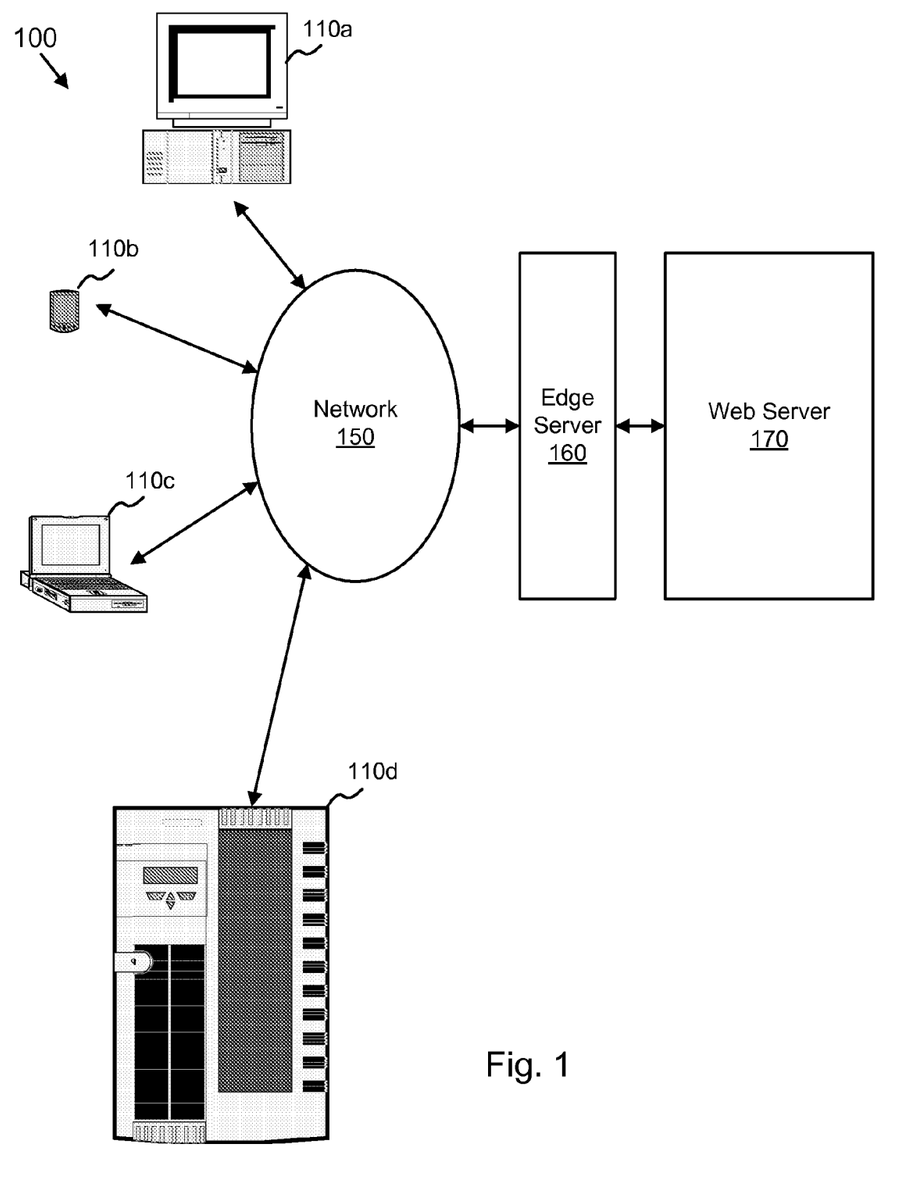
FIG. 1 is a schematic block diagram illustrating an exemplary hardware environment of a queuing system that may be modeled in accordance with the present invention.

FIG. 1 illustrates an exemplary computer hardware environment 100 of a queuing system that may be modeled in accordance with the present invention. In the exemplary environment 100, the infrastructure supporting most high volume web sites has multiple components includes clients 110a-d such as desktops, handhelds, laptops, and servers. The environment 100 may also include a network 150, a special purpose server known as an edge server 160, and a web server 170. Clients generate traffic that propagates through a network and arrives as a packet stream with an inter-arrival time distribution at the edge server 160. The web server 170 services the packet stream, typically providing web pages. One system performance metric that may be monitored is the time that a client waits for service. This metric depends on the arrival rate, the inter-arrival time distribution, and the service rate.

The clients 110a-d serve as the interface to the user. A client may comprise a personal computer running a web browser, or a wireless device for mobile users. The type of client may affect the delay for sending and receiving requests to the web server 170. The network 150, for example the Internet, can be modeled as a generic delay associated with transferring data between the web server 170 and the client 110.

The edge server 160 is typically a special purpose server acting as an interface between the network 150 and the web server 170. The edge server 160 may be implemented as a single server or multiple servers acting in parallel. The edge server 160 may implement one or more of the following functions: Firewall—which implements security features, Network Dispatcher—which routes incoming requests to multiple server nodes in the web server 170, and Content Caching—which holds cached copies of common content files (e.g. html, jpeg, etc.) and supplies them directly to clients 110 without interacting with the rest of the web server 170.

The edge server 160 typically performs queue management and enforces service discipline for the queue. The edge server 160 typically provides temporary storage for arriving data packets that cannot be serviced immediately. During normal operation, the web server 170 responds to requests at a rate that keeps ahead of the arriving data packets. If more data packets arrive than can be serviced, a queue builds within the edge server 160. If the number of requests exceeds the amount of available temporary storage, a buffer overrun condition ensues and client data packets may be ignored. A typical client response is to retry the operation, and so additional traffic is generated. It is desirable to provide sufficient web server capacity and sufficient edge server temporary storage to satisfy client service expectations and/or quality of service objectives.

Figure 2:
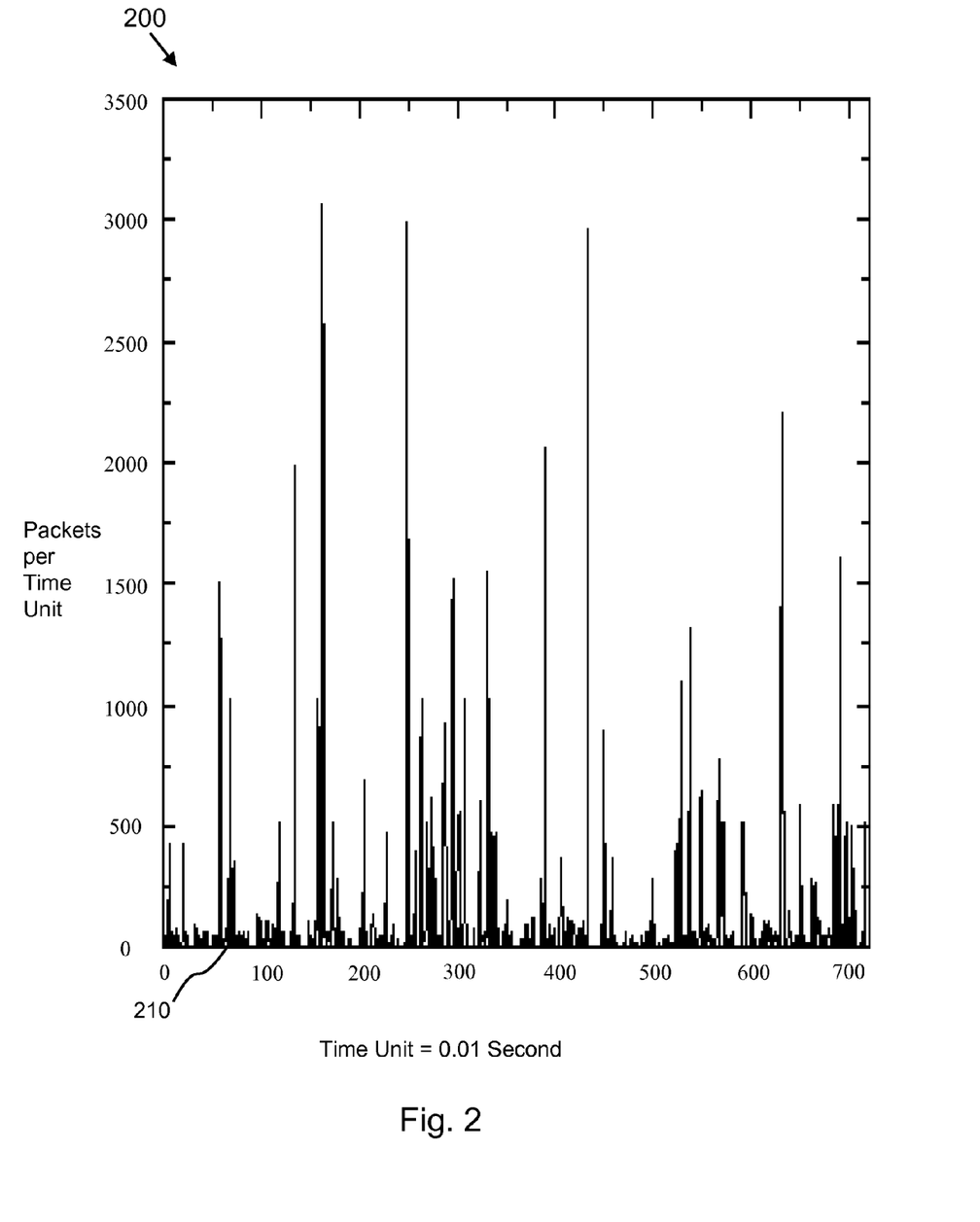
FIG. 2 is an illustration showing an exemplary network trace.

FIG. 2 illustrates an exemplary network trace 200 wherein packets per unit of time are counted. The horizontal axis comprises time using a 0.01 second timescale 210. The trace was captured at the input of an edge server similar to the edge server 160 of FIG. 1. Each trace point along the vertical axis represents a number of packets per unit of time, or in other words a packet arrival rate.

The network trace 200 exemplifies typical behavior on a network 150. The highest arrival rate was approximately 3100 packets per interval while the lowest arrival rate was zero packets per interval, with a mean of approximately 240 packets per interval or 24,000 packets per second. The relative variation around the mean, as measured by the standard deviation is approximately 475. The coefficient of variation, determined by the standard deviation divided by the mean is approximately 1.97, a value indicating much more variability than would be expected in a Poisson pattern for arrival rates.

Studies of large networks reveal several characteristics associated with burstiness that disagree with the standard Poisson model. The Poisson model forecasts that burst are predictable, that aggregation of many clients would mask burstiness, and that bursts would only be evident at small time scales. Studies have shown that bursts have no natural length, that aggregation intensifies burstiness, and that burstiness is exhibited at all time scales. Since highly variable arrival patterns, or burstiness is an integral part of network traffic behavior, it is desirable that service response models incorporate the influence of high arrival variability on queuing time delays.

Figure 3:
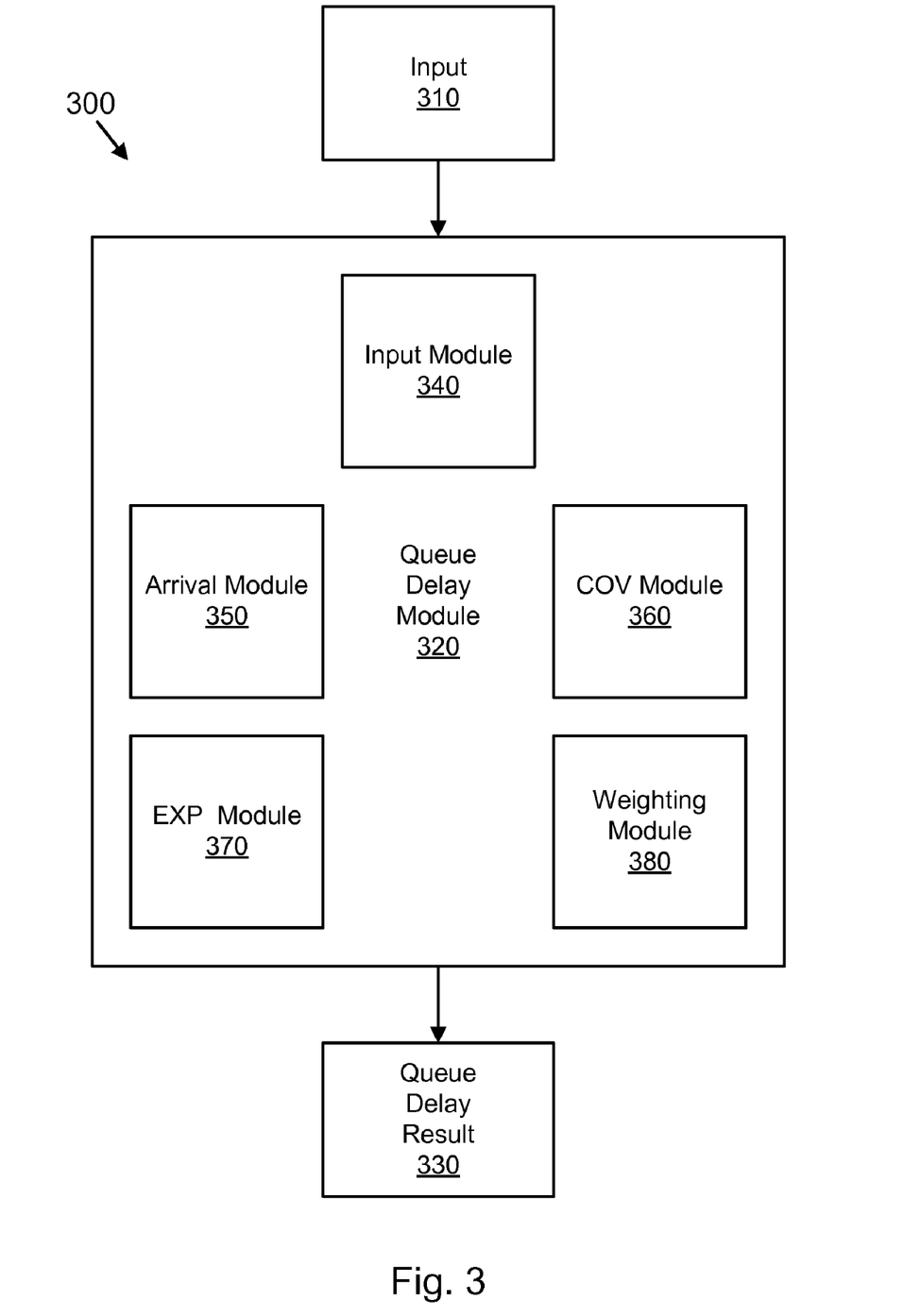
FIG. 3 is a schematic block diagram illustrating one embodiment of a queue delay modeling apparatus of the present invention.

FIG. 3 is a schematic block diagram illustrating one embodiment of an apparatus 300 for modeling a queue having highly variable arrival rates. The apparatus 300 includes input 310, a queue delay module 320, and a queue delay result 330. The depicted embodiment of the queue delay module 320 includes an input module 340, arrival module 350, a COV module 360, an EXP module 370, and a weighing module 380. The queue delay module 320 receives the input 310 and generates the queue delay result 330.

The input 310 comprises parameters characterizing service attributes and traffic arrival patterns. Some elements of the input 310 may be provided by a user and other elements may be provided by computer processes when the present invention is embedded within a system or used in conjunction with program processes that optimize system configurations. In the depicted embodiment, server characteristics such as a number of servers and server utilization may be included in the input, the server utilization being defined as the fraction of the time that the server is busy executing a transaction. For example, the ratio of "busy time" to "clock time" would characterize the server utilization. Server utilization U is a value between zero and one.

Other input 310 may be an expected average service time and a service coefficient of variation, where the service coefficient of variation is a representation of an service rate distribution. Characteristics of an expected service rate distribution may be estimated. In certain embodiments the service rate distribution may be assumed to be exponential. Often, the service coefficient of variation may be assigned a value of one.

Input 310 may also include an index of burstiness, the index of burstiness being an estimate of the variation between a normal period and a bursty period. For example, a coffee shop may experience a burst of customer arrivals between the hours of 7 AM and 9 AM and another burst of arrivals at lunchtime. The coffee shop owner may estimate the Index of Burstiness as two, meaning that the customer arrivals seem to double during breakfast and lunch time. Similarly, computer system administrators can estimate the Index of Burstiness for a system such as a website. This Index of Burstiness is relatively easy for business managers to comprehend and can be estimated based upon judgment and experience about the business and the typical workload.

The input module 340 receives input 310 such as an index of burstiness, a service time, a service coefficient of variation, a server utilization, and a number of servers. A user may provide some elements of the input 310 and computer processes may provide other elements.

The arrival module 350 utilizes an Index of Burstiness from the input 310 to determine an inter-arrival coefficient of variation. The coefficient of variation characterizes a relative spread of arrival times about a mean. The details of this determination are more thoroughly described in the method for determining a coefficient of variation discussed in relation to FIG. 5.

The COV module 360 utilizes the coefficient of variation determined by the arrival module 340. A server utilization, a number of servers, and a coefficient of service from the input 310 are used in conjunction with the inter-arrival coefficient of variation to determine an expected wait time. This wait time is determined using queuing algorithms that deal with bursty arrival times. The details of this determination are more thoroughly described in the method for determining a COV queue delay discussed in relation to FIG. 6.

The EXP module 370 utilizes a server utilization and number of servers from the input 310 to determine an expected wait time. This wait time is determined using queuing algorithms that deal with random arrival times. The details of this determination are more thoroughly described in the method for determining an EXP queue delay discussed in relation to FIG. 7.

The weighting module 380 determines the queue delay result 330 by disproportionately weighting the COV queue delay determined by the COV module 360 and the EXP queue delay determined by the EXP module 370. In certain embodiments, variants of the server utilization are used as weighting factors to emphasize the COV queue delay at high utilizations and emphasize the EXP queue delay at low utilizations. The details of this determination are more thoroughly described in the method for determining a queue delay in FIG. 8.

The queue delay result 330 is the expected time that a request waits in a queue given the arrival pattern and service characteristics of a queued system 100. The total response time is the queue delay result 330 plus the average service time. The queue delay result 330 and the total response time are frequently used to gauge performance for a queued system 100.

Those of ordinary skill in the art will recognize that the present invention is not limited to a web server configuration as described in FIG. 1. The present invention may be used to model any queuing system. For example, the input 310 may be based on traffic flow patterns, grocery checkout line patterns, or the like, and the queue delay result 330 may be applicable to time spent waiting in the corresponding queues such as time in commuter traffic, time waiting in line for groceries, and so forth.

Figure 4:
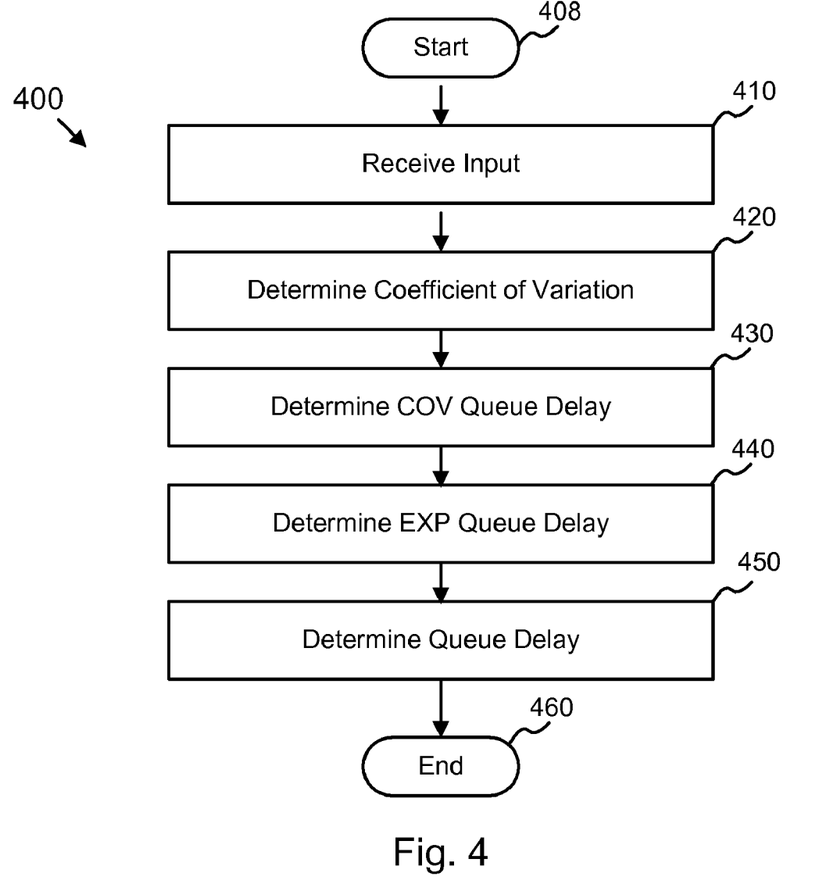
FIG. 4 is a schematic flow chart illustrating one embodiment of a method for modeling a queue having highly variable arrival rates in accordance with the present invention.

FIG. 4 is a schematic flow chart illustrating one embodiment of a method 400 for determining a queue delay for a queue having highly variable arrival rates in accordance with the present invention. The method 400 begins 408 when input is available. The method receives 410 input provided by a user or one or more computer processes. In one embodiment the input includes an index of burstiness, a service time, a service coefficient of variation, a server utilization, and a number of servers.

Next, the method 400 determines 420 an arrival coefficient of variation (inter-arrival COV) based upon the input received in step 410. The inter-arrival COV may be determined by computing the absolute value of the amount that the index of burstiness exceeds unity multiplied by one-half. The inter-arrival COV is a parameter reflecting the burstiness of the inter-arrival times. For an exponential arrival rate distribution, the inter-arrival COV is one. Studies show that the inter-arrival COV may be two to five times greater in bursty systems than in exponentially distributed systems.

The method 400 uses the inter-arrival COV to determine 430 a COV queue delay. The COV queue delay represents an arrival time distribution with high burstiness. Next, the method 400 determines 440, an EXP queue delay using algorithms based upon an exponentially distributed inter-arrival time pattern. The EXP queue delay represents a random arrival time distribution. Next, a queue delay is determined 450 by combining a disproportionably weighted COV queue delay and EXP queue delay. In a certain embodiment, a server utilization is used as a weighting factor, emphasizing the COV queue delay at high utilization and the EXP queue delay at low utilization. Once the queue delay is determined, the method 400 ends 460.

Figure 5:
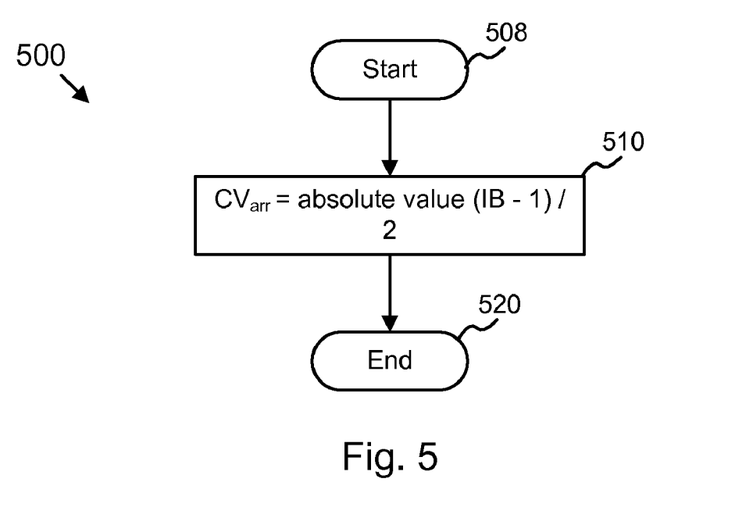
FIG. 5 is a schematic flow chart illustrating one embodiment of a method for determining an inter-arrival coefficient of variation in accordance with the present invention.

FIG. 5 is a schematic flow chart illustrating one embodiment of a method 500 for determining a coefficient of variation according to the present invention. The method 500 is an expanded description of the determining a coefficient of variation step 420 as described in relation to FIG. 4. The method 500 starts 508 when a user or one or more computer processes provides all input required for the determination of a queue delay result. In one embodiment, the required input includes an index of burstiness, a service time, a service coefficient of variation, a server utilization, and a number of servers.

Next the inter-arrival COV ($CV_{arr}$) is determined 510 using the Index of Burstiness (IB). The index of burstiness is a measure of the relative variation between a period of normal operation and period of bursty operation. For example, a drive-in restaurant with a normal arrival rate of customers compared with the increased arrival rate when a busload of hungry customers visits. The index of burstiness may be determined based on experience with similar businesses or projected based upon a future business model.

In one embodiment, the inter-arrival coefficient of variation is computed using the equation $CV_{arr}$=absolute value (IB−1)/2, where IB is the Index of Burstiness value. For example, if the ratio of high activity to low activity reflected in the index of burstiness were assigned a value of 4, the inter-arrival COV would be 1.5.

Determination of the inter-arrival COV based upon the Index of Burstiness has been shown to produce an accurate estimate compared with the determination of the inter-arrival COV based upon a characterized distribution. Advantageously, determination 510 is less complex and includes an estimated index of burstiness which is easier for a businessperson to conceptualize than statistical derivations. In addition, significant historical data is not required to determine the inter-arrival coefficient of variation. After determining of the inter-arrival COV, the method 500 ends 520.

Figure 6:
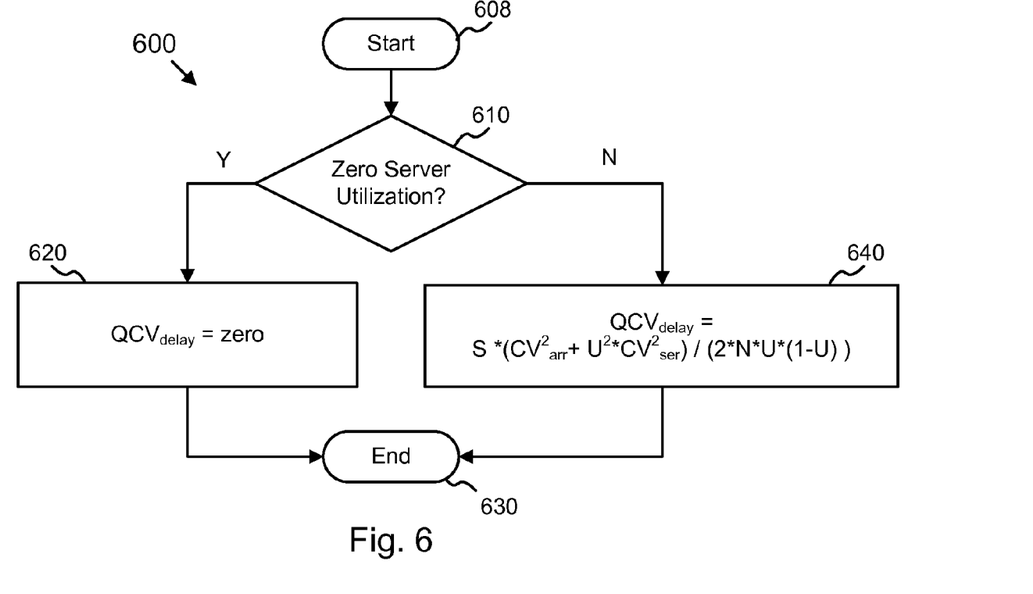
FIG. 6 is a schematic flow chart illustrating one embodiment of a method for determining a COV queue delay in accordance with the present invention.

FIG. 6 is a schematic flow chart illustrating one embodiment of a method 600 for determining a COV queue delay according to the present invention. The method 600 is an expanded description of determining a COV queue delay step 420 as described in relation to FIG. 4. The method 600 starts 608 once sufficient input 310 is provided and the coefficient of variation from method 500 is available.

First, a determination 610 is made regarding zero server utilization. The server utilization (U) is a ratio of the time that the server is busy to the total time, and has a value between 0 and 1. Since the value of the server utilization U is used as a divisor in subsequent calculations and since division by zero is problematic, the value of COV queue delay must be separately defined when U is zero. If the server utilization is zero, the method 600 defines 620 the value of the COV queue delay ($QCV_{delay}$) to be zero and the method 600 ends 630.

If the server utilization U is non-zero, the method 600 determines 640 the value of the COV queue delay. In one embodiment, the COV queue delay is determined by the equation $QCV_{delay}=S*(CV^2_{arr}+U^2*CV^2_{ser})/(2*N*U*(1-U))$, where $QCV_{delay}$ is the COV queue delay, S is an average service time, $CV^2_{arr}$ is the square of the inter-arrival coefficient of variation, U is the server utilization, $CV^2_{ser}$ is the square of the service coefficient of variation, and N is the number of servers. After the COV queue delay is determined 640 the method 600 ends 630.

Figure 7:
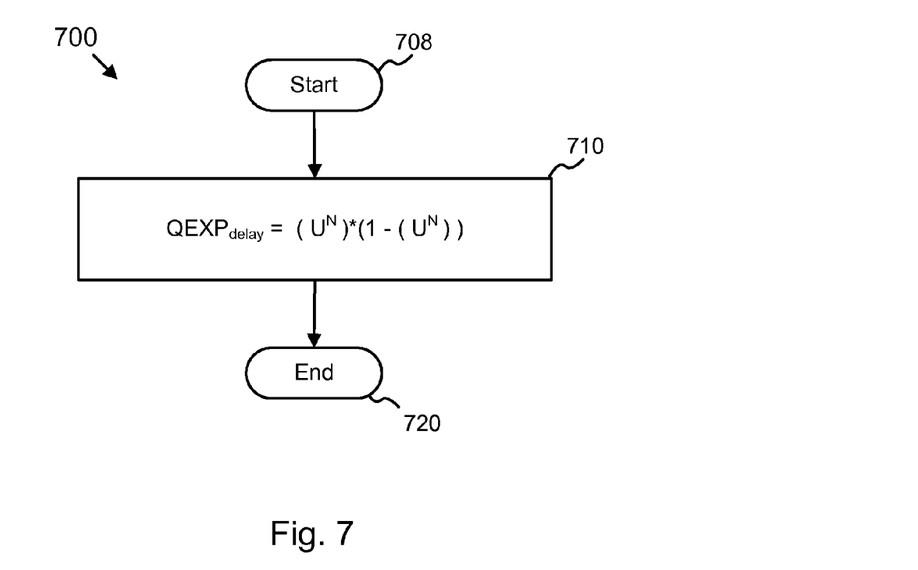
FIG. 7 is a schematic flow chart illustrating one embodiment of a method for determining an EXP queue delay in accordance with the present invention.

FIG. 7 is a schematic flow chart illustrating one embodiment of a method 700 for determining an EXP queue delay according to the present invention. The method 700 is an expanded description of determining an EXP queue delay step 430 as described in relation to FIG. 4. The method 700 starts 708 once sufficient input 310 is provided.

Method 700 determines 710 an EXP queue delay using a queuing algorithm based upon an exponential distribution of arrivals. In one embodiment, the method 700 determines 710 the EXP queue delay using the equation $QEXP_{delay}=(U^N)*(1-(U^N))$, wherein $QEXP_{delay}$ is the EXP queue delay, U is the server utilization, and N is the number of servers. The values of U and N may be provided by a user or may be provided by other another process when the present invention is embedded within a system or is performed in conjunction with processes that optimize system configurations. After determination 710 of the EXP queue delay, the method 700 ends 720.

Figure 8:
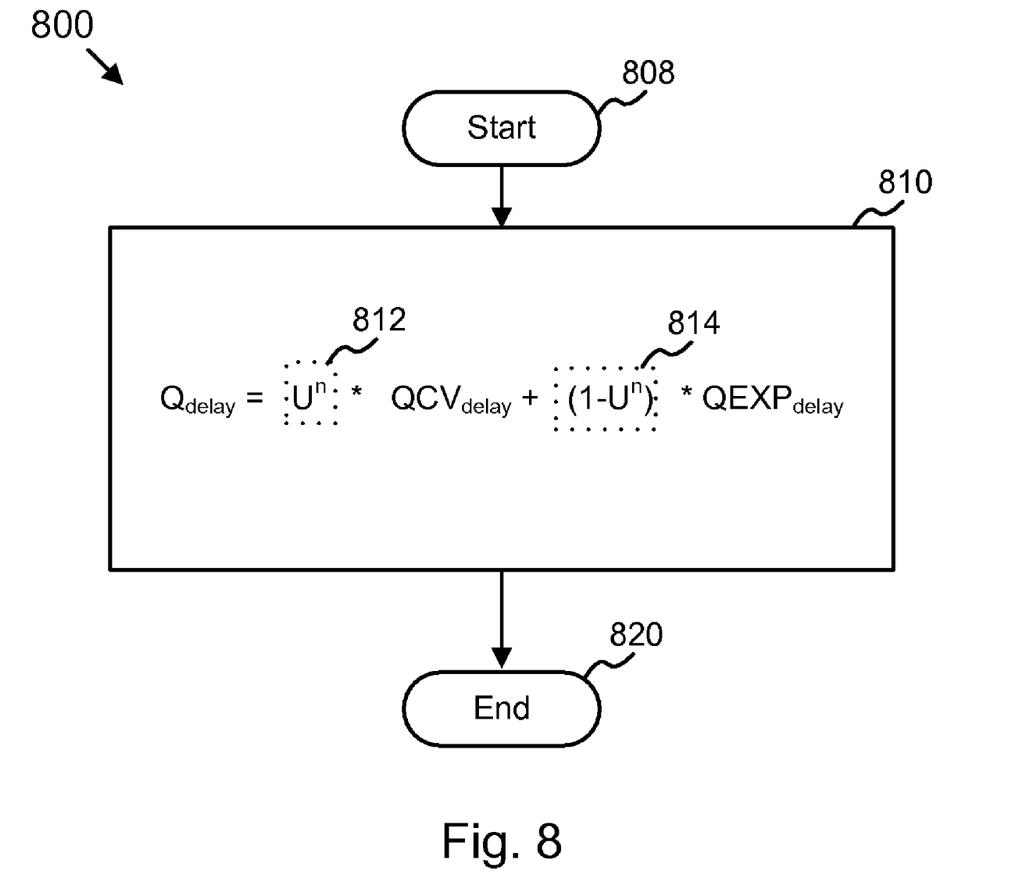
FIG. 8 is a schematic flow chart illustrating one embodiment of a method for determining a queue delay in accordance with the present invention.

FIG. 8 is a schematic flow chart illustrating one embodiment of a method 800 for determining a queue delay according to the present invention. The method 800 is an expanded description of determining a queue delay step 440 as described in relation to FIG. 4. The method 800 starts 808 once sufficient input 310 is provided, the COV queue delay is determined by method 600 and the EXP queue delay is determined by method 700.

Method 800 determines 810 queue delay using a weighted combination of the COV queue delay based upon the coefficient of variation and the EXP queue delay based upon an assumption of an exponential inter-arrival pattern. In one depicted embodiment, the method 800 determines 810 the queue delay using the equation $Q_{delay}=U^n QCV_{delay}+(1-U^n)*QEXP_{delay}$, wherein $Q_{delay}$ is the queue delay, U is the server utilization, $QCV_{delay}$ is the COV queue delay determined in step 420 of FIG. 4, $QEXP_{delay}$ is the EXP queue delay determined in step 430 of FIG. 4, and n is an integer greater than 1. A first weighting factor 812, $U^n$, and a second weighting factor 814, $1-U^n$, are applied respectively to the $QCV_{delay}$ and the $QEXP_{delay}$. The first factor 812 emphasizes the contribution of the COV queue delay at high server utilization and the second factor 814 emphasize the contribution of the EXP queue delay at low server utilization. In a certain embodiment, n is assigned a value of 2. In other embodiments, n is assigned a value greater than 2. After determining 810 the value of the queue delay, the method 800 ends 820.

In summary, the present invention provides an apparatus that allows accurate modeling of queue delays for systems with highly variable traffic arrival rates. For example, queuing systems having a coefficient of variation greater than one. The present invention provides unsophisticated users a less complex apparatus to conceptualize and estimate the effect of highly variable arrival rates. The present invention facilitates accurate system server specification and configuration to meet response time goals. In addition, the present invention may be used for modeling a variety of queuing-related systems in many different industries.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for modeling a queue having highly variable arrival rates:

an input module configured to receive an index of burstiness, a service time, a service coefficient of variation, a server utilization, and a number of servers;

an arrival module configured to determine an inter-arrival coefficient of variation (COV) using the index of burstiness;

a COV module configured to determine a COV queue delay comprising the inter-arrival coefficient of variation;

an exponential (EXP) module configured to determine an EXP queue delay using an exponential distribution of queue arrivals; and a weighting module configured to determine a queue delay using the COV queue delay and the EXP queue delay.

2. The apparatus of claim 1, wherein the weighting module is further configured to determine the queue delay by summing the COV queue delay multiplied by a first factor and the EXP queue delay multiplied by a second factor disproportionate to the first factor.

3. The apparatus of claim 2, wherein the first factor comprises the server utilization squared and the second factor comprises the amount that unity exceeds the server utilization squared.

4. The apparatus of claim 2, wherein the first factor comprises the server utilization raised to the power of n, and the second factor comprises one minus the server utilization raised to the power of n, n being a whole number greater than two.

5. The apparatus of claim 1, wherein the index of burstiness comprises a value representative of estimated arrival patterns.

6. The apparatus of claim 1, wherein the arrival module is further configured to determine the inter-arrival coefficient of variation as:

$$CV_{arr} = \text{absolute value } (IB-1)/2$$

where: $CV_{arr}$=inter-arrival coefficient of variation; and
IB=index of burstiness.

7. The apparatus of claim 1, wherein the COV module is configured to determine the COV queue delay as:

$$QCV_{delay} = S*(CV^2_{arr} + U^2*CV^2_{ser})/(2*N*U*(1-U))$$

where: $QCV_{delay}$=COV queue delay;
S=service time;
$CV_{arr}$=inter-arrival coefficient of variation;
U=server utilization;
$CV_{ser}$=service coefficient of variation; and
N=number of servers.

8. The apparatus of claim 1, wherein the EXP module is configured to determine the EXP queue delay as:

$$QEXP_{delay} = (U^N)*(1-(U^N))$$

where: $QEXP_{delay}$=EXP queue delay;
U=server utilization; and
N=number of servers.

9. The apparatus of claim 1, wherein the weighting module is configured to determine the queue delay as:

$$Q_{delay} = U^n*QCV_{delay} + (1-U^n)*QEXP_{delay}$$

where: $Q_{delay}$=queue delay;
U=server utilization;
$QCV_{delay}$=COV queue delay;
$QEXP_{delay}$=EXP queue delay and
n=a whole number greater than one.

10. An article of manufacture comprising a program storage medium readable by a processor and embodying one or more instructions executable by a processor to perform a method for estimating the queue delay time of queuing networks with highly variable traffic arrival rates, the method comprising:

receiving an index of burstiness, a service time, a service coefficient of variation, a server utilization, and a number of servers;

determining an inter-arrival coefficient of variation (COV) using the index of burstiness;

determining a COV queue delay comprising the inter-arrival coefficient of variation;

determining an exponential queue delay (EXP queue delay) using an exponential distribution of queue arrivals; and determining a queue delay using the COV queue delay and the EXP queue delay.

11. The article of manufacture of claim 10, further comprising determining the queue delay by summing the COV queue delay multiplied by a first factor and the EXP queue delay multiplied by a second factor disproportionate to the first factor.

12. The article of manufacture of claim 11, wherein the first factor comprises the server utilization squared and the second factor comprises the amount that unity exceeds the server utilization squared.

13. The article of manufacture of claim 11, wherein the first factor comprises the server utilization raised to the power of n, and the second factor comprises one minus the server utilization raised to the power of n, n being a whole number greater than two.

14. The article of manufacture of claim 10, wherein the index of burstiness comprises a value representative of estimated arrival patterns.

15. The article of manufacture of claim 10, further comprising determining the inter-arrival coefficient of variation as:

$$CV_{arr} = \text{absolute value } (IB-1)/2$$

where: $CV_{arr}$=inter-arrival coefficient of variation; and
IB=index of burstiness.

16. The article of manufacture of claim 10, further comprising determining the COV queue delay as:

$$QCV_{delay} = S*(CV^2_{arr} + U^2*CV^2_{ser})/(2*N*U*(1-U))$$

where: $QCV_{delay}$=COV queue delay;
S=service time;
$CV_{arr}$=inter-arrival coefficient of variation;
U=server utilization;
$CV_{ser}$=service coefficient of variation; and
N=number of servers.

17. The article of manufacture of claim 10, further comprising determining the EXP queue delay as:

$$QEXP_{delay} = (U^N)*(1-(U^N))$$

where: $QEXP_{delay}$=EXP queue delay;
U=server utilization; and
N=number of servers.

18. The article of manufacture of claim 10, further comprising determining the queue delay as:

$$Q_{delay} = U^n*QCV_{delay} + (1-U^n)*QEXP_{delay}$$

where: $Q_{delay}$=queue delay;
U=server utilization;
$QCV_{delay}$=COV queue delay;
$QEXP_{delay}$=EXP queue delay; and
n=a whole number greater than one.

* * * * *